United States Patent
Fan et al.

(10) Patent No.: US 12,540,983 B2
(45) Date of Patent: Feb. 3, 2026

(54) METHOD AND APPARATUS FOR IDENTIFYING ABNORMAL BATTERY CELL, ELECTRONIC DEVICE, AND STORAGE MEDIUM

(71) Applicant: CONTEMPORARY AMPEREX TECHNOLOGY (HONG KONG) LIMITED, Hong Kong (CN)

(72) Inventors: Xiaoyun Fan, Ningde (CN); Jianan Sun, Ningde (CN); Deming Lin, Ningde (CN); Jingliang Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 88 days.

(21) Appl. No.: 18/595,117

(22) Filed: Mar. 4, 2024

(65) Prior Publication Data

US 2024/0255581 A1 Aug. 1, 2024

Related U.S. Application Data

(63) Continuation of application No. PCT/CN2022/087736, filed on Apr. 19, 2022.

(51) Int. Cl.
*G01R 31/367* (2019.01)
*G01R 31/385* (2019.01)

(52) U.S. Cl.
CPC ....... *G01R 31/3865* (2019.01); *G01R 31/367* (2019.01)

(58) Field of Classification Search
CPC .................. G01R 31/3865; G01R 31/367
USPC .................................. 324/500, 600, 76.11
See application file for complete search history.

(56) References Cited

U.S. PATENT DOCUMENTS

| | | | |
|---|---|---|---|
| 11,588,192 B2* | 2/2023 | Engle | H01M 50/578 |
| 11,626,626 B2* | 4/2023 | Fahad | G01N 33/0031 |
| | | | 340/632 |
| 2013/0268466 A1* | 10/2013 | Baek | G01R 31/392 |
| | | | 706/12 |
| 2013/0335009 A1 | 12/2013 | Katsumata et al. | |
| 2019/0304849 A1 | 10/2019 | Cheong et al. | |

(Continued)

FOREIGN PATENT DOCUMENTS

| | | |
|---|---|---|
| CN | 106198293 A | 12/2016 |
| CN | 109164146 A | 1/2019 |

(Continued)

OTHER PUBLICATIONS

The Japan Patent Office (JPO) Notification of Reasons for Refusal for Application No. 2024-510729 Feb. 18, 2025 6 Pages (including translation).

(Continued)

*Primary Examiner* — Huy Q Phan
*Assistant Examiner* — Truong Q Nguyen
(74) *Attorney, Agent, or Firm* — ANOVA LAW GROUP, PLLC

(57) ABSTRACT

A method for identifying abnormal battery cell includes determining, based on target feature data of a battery cell, whether the battery cell is an abnormal battery cell. The target feature data includes feature data used for differentiation between an abnormal battery cell and a normal battery cell generated during a formation process.

7 Claims, 7 Drawing Sheets

(56) References Cited

U.S. PATENT DOCUMENTS

| | | | | |
|---|---|---|---|---|
| 2020/0266405 A1* | 8/2020 | Pokora | ............... | H01M 10/486 |
| 2021/0257680 A1* | 8/2021 | Komiyama | .......... | G01R 31/392 |
| 2024/0175936 A1* | 5/2024 | Cho | .................... | G01R 31/392 |
| 2024/0385255 A1* | 11/2024 | Nam | ................ | G01R 19/16542 |

FOREIGN PATENT DOCUMENTS

| | | |
|---|---|---|
| CN | 109375116 A | 2/2019 |
| CN | 110514724 A | 11/2019 |
| CN | 113991198 A | 1/2022 |
| CN | 114117825 A | 3/2022 |
| CN | 114200329 A | 3/2022 |
| GB | 2586829 A | 3/2021 |
| JP | 2002199608 A | 7/2002 |
| JP | 2014002055 A | 1/2014 |
| JP | 2020087640 A | 6/2020 |
| KR | 20130142884 A | 12/2013 |
| KR | 20160101506 A | 8/2016 |

OTHER PUBLICATIONS

The Korean Intellectual Property Office Notice of Submission of Opinion for Application No. 10-2024-7006731 Apr. 4, 2025 13 Pages (including translation).

The European Patent Office (EPO) The Extended European Search Report for Application No. 22937769.2 Apr. 7, 2025 101 Pages.

The World Intellectual Property Organization (WIPO) International Search Report and Written Opinion for PCT/CN2022/087736 Jan. 12, 2023 15 Pages (including translation).

The Japan Patent Office (JPO) Notification of grant patent right for invention for Application No. 2024-510729 May 27, 2025 5 Pages (including translation).

* cited by examiner

METHOD AND APPARATUS FOR IDENTIFYING ABNORMAL BATTERY CELL, ELECTRONIC DEVICE, AND STORAGE MEDIUM

CROSS-REFERENCE TO RELATED APPLICATION

This application is a continuation of International Application No. PCT/CN2022/087736, filed on Apr. 19, 2022, the entire content of which is incorporated herein by reference.

TECHNICAL FIELD

This application relates to the field of batteries, and specifically to a method and apparatus for identifying abnormal battery cell, an electronic device, and a storage medium.

BACKGROUND

Formation of lithium-ion batteries is a critical step in battery production. The results of formation directly affect the cycle life, rate performance, high- and low-temperature performance, and other properties of batteries. Abnormalities (such as electrolyte injection errors, electrolyte mixing, or excessive water content) that occur in the battery production process can lead to battery issues such as lithium precipitation, low capacity, and poor SEI film, thereby affecting the cycling performance and safety of batteries. Loading of these abnormal batteries affects the performance of the battery system, and as the integration of the battery system increases, the removal of abnormal battery cells becomes increasingly difficult. The loading of abnormal battery cells results in the entire battery pack being scrapped. Therefore, it is needed to identify abnormal battery cells before the battery cells are loaded.

SUMMARY

The purpose of embodiments of this application is to provide a method and apparatus for identifying abnormal battery cell, an electronic device, and a storage medium, so as to identify an abnormal battery cell before the battery cell is loaded.

According to a first aspect, an embodiment of this application provides a method for identifying abnormal battery cell, including determining, based on target feature data of a battery cell, whether the battery cell is an abnormal battery cell; where the target feature data includes feature data used for differentiation between an abnormal battery cell and a normal battery cell generated during a formation process.

In the technical solution of the embodiments of this application, the target feature data used for differentiation between an abnormal battery cell and a normal battery cell generated during the formation process of the battery cell is analyzed to determine whether the battery cell is an abnormal battery cell. On the one hand, there is a clear distinction in target feature data between an abnormal battery cell and a normal battery cell without abnormalities during the formation process of battery cells. Therefore, whether a battery cell is an abnormal battery cell can be accurately determined based on the target feature data, achieving reliable identification for an abnormal battery cell. On the other hand, since a formation process of a battery cell always occurs before the battery cell is loaded into a battery pack in an industrial production process, the purpose of identifying an abnormal battery cell before the battery cell is loaded can also be effectively achieved, reducing the risk of decreasing the battery system performance caused by loading abnormal battery cells and the risk of scrapping the battery pack caused by loading abnormal battery cells.

In some embodiments, the target feature data includes feature data influenced by electrolyte in the battery cell generated during the formation process.

In the technical solution of the embodiments of this application, whether an electrolyte abnormality has occurred in the battery cell can be accurately determined based on the target feature data influenced by the electrolyte in the battery cell generated during the formation process of the battery cell, thereby achieving accurate identification for an abnormal battery cell with electrolyte abnormality. Currently, there are two main methods for identifying abnormal battery cell with electrolyte abnormality.

Method one: Measuring resistance of an electrolyte in a battery cell and then performing matching between the measured resistance and the standard resistance of the electrolyte. Under a condition that the matching fails, it is determined that an electrolyte abnormality has occurred in the battery cell. However, for electrolytes with similar compositions, their standard resistances are also similar, and therefore this method has poor detection effectiveness for electrolytes with similar compositions and may even fail to detect abnormalities.

Method two: Dismantling a battery cell and analyzing compositions of an electrolyte sample to identify whether an electrolyte abnormality has occurred in a battery. However, this method requires a long time for analysis and has a slow analysis speed, which cannot meet production requirements. Additionally, this method requires dismantling the battery cell for sampling, making it impractical to analyze the electrolyte in each battery cell.

It can be seen that, compared to method one, the technical solution of the embodiments of this application is not influenced by the composition of the electrolyte itself. Even for electrolytes with similar compositions, reliable identification can be achieved based on the target feature data generated during the formation process. In comparison to method two, the detection method in the embodiments of this application does not require disassembling the battery cell. This results in high analysis efficiency and faster analysis speeds that can meet production requirements. Furthermore, this detection method enables identification of each battery cell, providing higher reliability.

In some embodiments, the target feature data includes feature data influenced by water content in the battery cell generated during the formation process.

In the technical solution of the embodiments of this application, whether water content is abnormal in the battery cell can be accurately determined based on the target feature data influenced by the water content in the battery cell generated during the formation process of the battery cell, thereby achieving accurate identification for an abnormal battery cell with abnormal water content.

Currently, an identification method for abnormal battery cells with abnormal water content mainly involves the following steps: during actual battery production, leaving battery cells standing at a high temperature for a long period, selecting some battery cells as sample battery cells, extracting internal electrode plates from jelly rolls of the sample battery cells, baking the electrode plates using a stepwise heating method, and loading volatile substances into a moisture testing system by using high-purity nitrogen as the carrier gas for testing to determine water content of the sample battery cells. This method is a destructive test. After the test, the sample battery cells are destroyed and cannot be used, so not all battery cells can be tested. Additionally, the test results of the sample battery cells cannot represent the actual water content of each battery cell. For example, even if the test result of the sample battery cell is qualified, individual battery cells may still have excessive water content due to the actual production conditions of the battery cells. Therefore, the existing method has low identification reliability and does not meet the requirements for monitoring and managing battery cells. In contrast, the technical solution in the embodiments of this application can identify abnormal battery cells based on the target feature data influenced by water content in each battery cell generated during the formation process, without causing damage to the battery cells. Therefore, this solution allows for testing of all battery cells, resulting in an individual identification result for each battery cell, thereby providing higher reliability and meeting the requirements for monitoring and managing battery cells.

In some embodiments, the target feature data includes a first target parameter value corresponding to the first arrival of a parameter variation at a first process variation and a second target parameter value corresponding to the first arrival of the parameter variation at a second process variation, during a process of collecting parameters in the first stage of the formation process; where the first process variation and the second process variation are different.

In practical application, after extensive experiments, the inventors have found that abnormal battery cells with electrolyte abnormalities or abnormal water content exhibit significant differences in the parameter change process compared to normal battery cells without abnormalities in the first stage of the formation process. The differences are: parameter values corresponding to the first arrival at a given process variation are different between the abnormal battery cells and the normal battery cells. Based on this, in the above technical solution, the first target parameter value corresponding to the first arrival of the parameter variation at the first process variation during the process of collecting parameters in the first stage, and the second target parameter value corresponding to the first arrival of the parameter variation at the second process variation during the process of collecting parameters in the second stage are used as the basis for determining whether the battery cell has electrolyte abnormalities or abnormal water content, such that accurate identification for abnormal battery cells with electrolyte abnormalities or abnormal water content can be achieved by combining the two target parameter values, thereby improving the identification reliability.

In some embodiments, the determining, based on target feature data, whether the battery cell is an abnormal battery cell includes: inputting the target feature data into a preset identification model to obtain an identification result of whether the battery cell is an abnormal battery cell.

In the above technical solution, the preset identification model is used for processing the target feature data, such that abnormal battery cells are quickly identified by using powerful recognition ability of the model.

In some embodiments, the identification model is a two-dimensional Gaussian model.

The two-dimensional Gaussian model is a model that can well reflect the distribution of different types of data. In the above technical solution, the two-dimensional Gaussian model is used for identification to quickly differentiate between abnormal battery cells and normal battery cells.

In some embodiments, the inputting the target feature data into a preset identification model to obtain an identification result of whether the battery cell is an abnormal battery cell includes: inputting the target feature data into the two-dimensional Gaussian model to obtain a probability density of the battery cell calculated by the two-dimensional Gaussian model; and under a condition that the probability density of the battery cell is less than a preset probability density threshold, determining that the battery cell is an abnormal battery cell.

In the above technical solution, whether the battery cell is abnormal can be quickly determined based on the probability density of the battery cell calculated by the two-dimensional Gaussian model, thereby improving the efficiency of identifying abnormal battery cells.

In some embodiments, the inputting the target feature data into a preset identification model to obtain an identification result of whether the battery cell is an abnormal battery cell includes: inputting the target feature data into the two-dimensional Gaussian model to obtain a probability density of the battery cell calculated by the two-dimensional Gaussian model; and under a condition that the probability density of the battery cell is less than a preset probability density threshold and that the target feature data is within a preset feature range, determining that the battery cell is an abnormal battery cell.

In the above technical solution, the probability density of the battery cell and whether the target feature data of the battery cell is within a preset feature range are combined to determine whether the battery cell is abnormal from two aspects, thereby improving the reliability of identifying abnormal battery cells.

In some embodiments, the determining, based on target feature data of a battery cell, whether the battery cell is an abnormal battery cell includes: determining, during the formation process of the battery cell based on the target feature data of the battery cell, whether the battery cell is an abnormal battery cell.

In the above technical solution, whether the battery cell is an abnormal battery cell is determined based on the target feature data of the battery cell during the formation process of the battery cell, such that identification and screening of abnormal battery cells can be performed in the formation stage of the battery cells, achieving early identification for abnormal battery cells and avoiding the inclusion of abnormal battery cells in subsequent production processes, reducing waste of resources.

According to a second aspect, an embodiment of this application provides an apparatus for identifying abnormal battery cell, including an identification module configured to determine, based on target feature data of a battery cell, whether the battery cell is an abnormal battery cell; where the target feature data includes feature data used for differentiation between an abnormal battery cell and a normal battery cell generated during a formation process.

In some embodiments, the target feature data includes feature data influenced by electrolyte in the battery cell generated during the formation process.

In some embodiments, the target feature data includes feature data influenced by water content in the battery cell generated during the formation process.

In some embodiments, the target feature data includes a first target parameter value corresponding to the first arrival of a parameter variation at a first process variation and a second target parameter value corresponding to the first arrival of the parameter variation at a second process variation, during a process of collecting parameters in the first stage of the formation process; where the first process variation and the second process variation are different.

In some embodiments, the identification module is specifically configured to input the target feature data into a preset identification model to obtain an identification result of whether the battery cell is an abnormal battery cell.

In some embodiments, the identification model is a two-dimensional Gaussian model.

In some embodiments, the identification module is specifically configured to: input the target feature data into the two-dimensional Gaussian model to obtain a probability density of the battery cell calculated by the two-dimensional Gaussian model; and under a condition that the probability density of the battery cell is less than a preset probability density threshold, determine that the battery cell is an abnormal battery cell.

In some embodiments, the identification module is specifically configured to: input the target feature data into the two-dimensional Gaussian model to obtain a probability density of the battery cell calculated by the two-dimensional Gaussian model; and under a condition that the probability density of the battery cell is less than a preset probability density threshold and that the target feature data is within a preset feature range, determine that the battery cell is an abnormal battery cell.

In some embodiments, the identification module is specifically configured to determine, during the formation process of the battery cell based on the target feature data of the battery cell, whether the battery cell is an abnormal battery cell.

According to a third aspect, an embodiment of this application provides an electronic device including a processor and a memory; where the processor is configured to execute one or more instructions stored in the memory so that the processor is configured to execute a program stored in the memory to implement any one of the foregoing methods for identifying abnormal battery cell.

According to a fourth aspect, an embodiment of this application further provides a computer-readable storage medium, where the computer-readable storage medium stores one or more instructions, the instructions being executable by the processor to implement any one of the foregoing methods for identifying abnormal battery cell.

BRIEF DESCRIPTION OF DRAWINGS

In order to describe the technical solutions in the embodiments of this application more clearly, the following briefly describes the accompanying drawings required for describing the embodiments of this application. It is appreciated that the accompanying drawings below only show some embodiments of this application and thus should not be considered as limitations on the scope. Persons of ordinary skill in the art may still derive other related drawings from the accompanying drawings without creative efforts.

DESCRIPTION OF EMBODIMENTS

Figure 1:
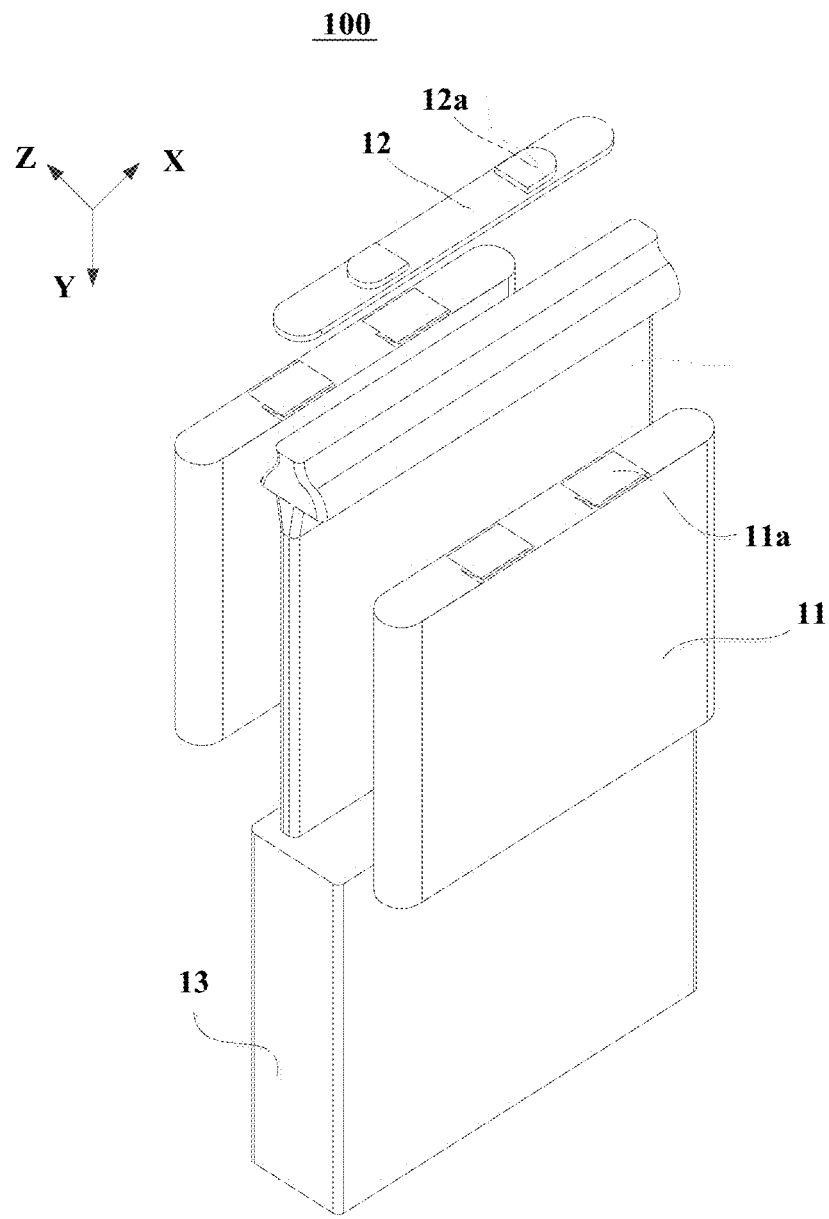
FIG. 1 is a schematic structural diagram of a battery unit according to an embodiment of this application.

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the description of embodiments of this application, "plurality" means more than two (including two), unless otherwise clearly and specifically limited.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in this application as appropriate to specific situations.

Currently, from a perspective of the market development, application of traction batteries is being more extensive. Traction batteries are widely used not only in energy storage power supply systems such as hydro, thermal, wind, and solar power plants, but also in electric transportation tools such as electric bicycles, electric motorcycles, electric vehicles.

In these fields, the most commonly used traction batteries are lithium-ion batteries (batteries composed of lithium-ion cells). The inventors have noticed that once abnormalities (including but not limited to electrolyte abnormalities (such as electrolyte injection errors and electrolyte mixing), and abnormal water content) occur in battery cells during the production process of lithium-ion batteries, it can lead to issues such as lithium precipitation, low capacity, and poor SEI film quality. Lithium precipitation can potentially cause severe safety problems such as thermal runaway, while low capacity significantly affects the performance and user experience of the battery cell, and poor SEI film quality affects the cycling performance and safety of batteries. Therefore, the loading of abnormal battery cells can affect the performance of the battery system. Furthermore, as integration of battery systems increases, it is extremely difficult to remove battery cells. Therefore, once an abnormal battery cell is loaded into a battery pack, even if the abnormal battery cell is found later through technical means, it is difficult to remove the abnormal battery cell. Loading of the abnormal battery cell can result in scrapping of an entire battery pack loaded with the abnormal battery cell. Therefore, it is needed to identify abnormal battery cells before the battery cells are loaded.

The inventors have further noted that formation of lithium-ion batteries is a key step in the production of batteries and that subsequent steps (including the step of battery cell loading) proceed only after the battery cells undergo formation. Process data (including but not limited to battery formation steps, time, current, voltage, temperature, and atmospheric pressure.) in the battery formation process is saved at the second and millisecond level. For battery cells with electrolyte abnormalities and battery cells without electrolyte abnormalities, values of some parameters differ during the formation process.

Based on the above considerations, to meet the demand for identifying abnormal battery cells before the battery cells are loaded, the inventors have conducted in-depth research and designed a method for identifying abnormal battery cell, which involves obtaining target feature data used for differentiation between an abnormal battery cell and a normal battery cell generated during a formation process of the battery cells and then determining, based on the target feature data, whether the battery cell is an abnormal battery cell. On the one hand, as there is a clear distinction in target feature data between an abnormal battery cell and a normal battery cell during the formation process of battery cells, whether a battery cell is an abnormal battery cell can be accurately determined, achieving reliable identification for an abnormal battery cell. On the other hand, since a formation process of a battery cell always occurs before the battery cell is loaded into a battery pack in an industrial production process, the purpose of identifying an abnormal battery cell before the battery cell is loaded can also be effectively achieved, reducing the risk of decreasing the battery system performance caused by loading abnormal battery cells and the risk of scrapping the battery pack caused by loading abnormal battery cells.

To facilitate understanding of the embodiments of this application, some basic information related to the embodiments of this application is described below.

A battery pack is composed of a plurality of battery units. The battery unit is a smallest unit constituting a battery pack. There may be a plurality of battery units in one battery pack. The plurality of battery units may be connected in series, parallel, or series-parallel. Being connected in series-parallel means a combination of series and parallel connections of the plurality of battery units. The plurality of battery units may be directly connected in series, parallel, or series-parallel, and then an entirety of the plurality of battery cells is accommodated in a box or other packaging, forming an entirety that can be charged and discharged externally.

In practical applications, a battery pack can be used as a single battery to provide services. However, a plurality of battery packs can also be connected in series, parallel, or series-parallel to form an entirety, and the entirety is accommodated in a box or other packaging to provide services as a battery. That is, in a battery, there can be one or more battery packs.

Referring to FIG. 1, a battery unit 100 can include a battery cell 11, an end cover 12, a housing 13, and other functional components. Among them:

The end cover 12 is a component that closes over an opening of the housing 13 to separate the internal environment of the battery unit 100 from the external environment. The shape of the end cover 12 is not limited and may be adapted to the shape of the housing 13 to fit the housing 13. Functional components such as an electrode terminal 12a may be provided on the end cover 12. The electrode terminal 12a may be electrically connected to the battery cell 11 for outputting or inputting electrical energy of the battery unit 100.

The housing 13 is an assembly configured to form the internal environment of the battery unit 100 together with the end cover 12, where the formed internal environment may be used to accommodate the battery cell 11, an electrolyte, and other components.

The battery cell 11 is a component in which electrochemical reactions take place in the battery unit 100. The housing 13 may include one or more battery cells 11. The battery cell 11 is mainly formed by winding or stacking a positive electrode plate and a negative electrode plate, and a separator is generally provided between the positive electrode plate and the negative electrode plate. Parts of the positive electrode plate and the negative electrode plate with active substances of the battery cell 11 constitute a body portion of the battery cell assembly, while parts of the positive electrode plate and the negative electrode plate without active substances separately constitute a tab 11a. A positive electrode tab and a negative electrode tab may both be located at one end of the body portion or be located at two ends of the body portion respectively. During charging and discharging of the battery, a positive electrode active substance and a negative electrode active substance react with an electrolyte, and the tabs 11a are connected to electrode terminals to form a current loop.

Each battery unit 100 may be a secondary battery or a primary battery. The battery unit 100 may be cylindrical, flat, cuboid, or of other shapes.

Formation of a lithium-ion battery refers to the process of activating the positive and negative electrode materials inside the battery cell by means of a plurality charging and discharging cycles after the battery is manufactured, improving the self-discharge, charge-discharge performance, and storage performance of the battery. In the embodiments of this application, a stage in which charging is performed for the first time in the formation process is referred to as the first stage.

In the embodiments of this application, the formation can be performed for battery cells that are not assembled into the battery unit 100, or for battery cells assembled into the battery unit 100.

It should be understood that the abnormalities mentioned in the embodiments of this application include, but are not limited to, electrolyte abnormalities and water content abnormalities in the battery cell. Electrolyte abnormalities means that the electrolyte injected into the battery cell does not achieve the expected effect. The causes of electrolyte abnormalities include electrolyte injection errors, electrolyte contamination during the injection process, and the like. Water content abnormalities means that the water content in the battery cell does not meet the predetermined specifications (such as excessive or insufficient water content).

Figure 2:
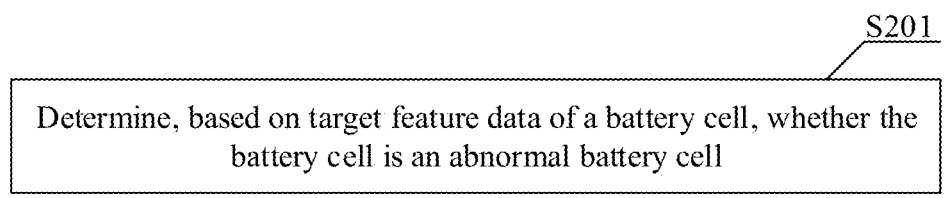
FIG. 2 a schematic flowchart of a method for identifying abnormal battery cell according to an embodiment of this application.

Based on the above description, according to some embodiments of this application, referring to FIG. 2, FIG. 2 is a basic flowchart of a method for identifying abnormal battery cell according to an embodiment of this application, including the following steps.

S201. Determine, based on target feature data of a battery cell, whether the battery cell is an abnormal battery cell.

It should be understood that, in some embodiments of this application, the target feature data is feature data used for differentiation between an abnormal battery cell and a normal battery cell generated during a formation process.

For example, the target feature data may include feature data influenced by electrolyte in the battery cell generated during the formation process, thereby differentiating between an abnormal battery cell with electrolyte abnormalities and a normal battery cell based on the target feature data. For another example, the target feature data may include feature data influenced by water content in the battery cell generated during the formation process, thereby differentiating between an abnormal battery cell with abnormal water content and a normal battery cell based on the target feature data.

In the embodiments of this application, the target feature data may be values of film-forming peak (dQ/dV, where dQ represents the amount of current flowing through the battery cell per unit time and dV represents the voltage change per unit time in the battery cell), dynamic internal resistance (V/I, where V represents the voltage and I represents the current), dV/dQ, and other parameters generated during the formation process at a specific location.

In the embodiments of this application, during the formation process or after the completion of the formation process, formation process data (including but not limited to the steps of battery formation, time, current, voltage, temperature, atmospheric pressure, and other data) generated during the formation process of the battery cell can be imported into an electronic device that can perform the method for identifying abnormal battery cell provided in the embodiments of this application, so that the electronic device can obtain the target feature data of the battery cell from the formation process data.

In the embodiments of this application, under a condition that the target feature data of the battery cell is obtained during the formation process, whether the battery cell is an abnormal battery cell can be determined based on the target feature data of the battery cell at the formation stage of the battery cell. In this way, abnormal battery cells can be identified and screened in the formation stage of the battery cells. This enables early identification of abnormal battery cells, avoiding the abnormal battery cells from entering subsequent production processes, thereby reducing the waste of resources.

It should be understood that values of parameters are constantly changing during the formation process. During the formation process, in some positions or intervals, values of parameters may be similar between an abnormal battery cells with abnormalities and a normal battery cell without abnormalities. Therefore, differentiation is not effective based on the parameter values of these parameters in these positions or intervals. On the contrary, in some other positions or intervals, parameter values exhibit significant differences between the abnormal battery cells and the normal battery cells, making it possible to effectively differentiate between abnormal battery cells and normal battery cells. The parameter values in these given positions or intervals can be used as the target feature data in the embodiments of this application to achieve identification of whether the battery cell is an abnormal battery cell.

For example, after extensive experiments, the inventors have found that abnormal battery cells with electrolyte abnormalities exhibit significant differences in the parameter change process compared to normal battery cells without electrolyte abnormalities in the first stage of the formation process. The differences are: parameter values corresponding to the first arrival at a given process variation are different between abnormal battery cells with electrolyte abnormalities and normal battery cells without electrolyte abnormalities. Similarly, after extensive experiments, the inventors have further found that abnormal battery cells with abnormal water content also exhibit significant differences in the parameter change process compared to normal battery cells without abnormal water content in the first stage of the formation process. The differences are: parameter values corresponding to the first arrival at a given process variation are different between abnormal battery cells with abnormal water content and normal battery cells without electrolyte abnormalities. The difference between the two types of battery cells lies in only process variations that reflect the differences between abnormal battery cells and normal battery cells.

Based on the above findings, in an optional implementation of the embodiments of this application, the target feature data may include a first target parameter value corresponding to the first arrival of a parameter variation at a preset first process variation during a process of collecting parameters in the first stage of the formation process, such that the first target parameter value corresponding to the first arrival of the parameter variation at the first process variation is used as the basis for determining whether the battery cell has electrolyte abnormalities, thereby identifying abnormal battery cells with electrolyte abnormalities.

In an optional implementation of the embodiments of this application, the target feature data may include a first target parameter value corresponding to the first arrival of a parameter variation at a first process variation and a second target parameter value corresponding to the first arrival of the parameter variation at a second process variation, during a process of collecting parameters in the first stage of the formation process; where the first process variation and the second process variation are different. In this way, during the process of collecting parameters in the first stage, the first target parameter value corresponding to the first arrival of the parameter variation at the first process variation and the second target parameter value corresponding to the first arrival of the parameter variation at the second process variation are used as the basis for determining whether the battery cell has electrolyte abnormalities, such that accurate identification for abnormal battery cells with electrolyte abnormalities can be achieved by combining the two target parameter values.

It should be noted that in the embodiments of this application, a large number of sample battery cells including abnormal battery cells and normal battery cells can be obtained in advance. Then, based on the parameters of the sample battery cells collected in the first stage of the formation process, the first process variation and the second process variation that reflect the differences between abnormal battery cells and normal battery cells can be determined.

For example, to identify abnormal battery cells with electrolyte abnormalities, the first process variation and the second process variation can be determined based on parameters of sample battery cells with electrolyte abnormalities and sample battery cells without electrolyte abnormalities collected in the first stage of the formation process. Similarly, to identify abnormal battery cells with abnormal water content, the first process variation and the second process variation can be determined based on parameters of sample battery cells with abnormal water content and sample battery cells without abnormal water content collected in the first stage of the formation process. For details about the determination method for the first process variation and the second process variation, refer to the following description.

It should be noted that in the embodiments of this application, the target parameter can be parameters that can reflect changes (for example, electrolyte or water content of the battery cell) in the formation process and that are related to causes of abnormalities of the battery cells, such as film-forming peak, dynamic internal resistance, and dV/dQ. A target parameter value is a value of a target parameter.

It should be further noted that the process variation in the embodiments of this application is a variation of the target parameter within a specified collection time interval (such as a collection time interval between two adjacent collection points). For example, assuming that the target parameter is the film-forming peak, the process variation may be a film-forming peak gradient value.

It should be understood that, there is a clear distinction in target feature data between an abnormal battery cell and a normal battery cell during the formation process of battery cells. Therefore, whether a battery cell is an abnormal battery cell can be accurately determined based on the target feature data, achieving reliable identification for an abnormal battery cell.

To accurately determine whether the battery cell is an abnormal battery cell, in an optional implementation of the embodiments of this application, a threshold range can be specified based on differences in target feature data ranges between abnormal battery cells and normal battery cells as summarized in advance, to determine whether the battery cell is an abnormal battery cell. (That is, whether the target feature data is greater than or less than the preset threshold range is determined to determine whether the battery cell is an abnormal battery cell based on a relationship, between the target feature data and the threshold range, summarized for abnormal battery cells and normal battery cells.)

For example, it is assumed that the abnormal battery cells to be identified are abnormal battery cells with electrolyte abnormalities. In this case, a first threshold range corresponding to abnormal battery cells with electrolyte abnormalities can be summarized in advance based on target feature data of a large number of sample battery cells with electrolyte abnormalities and sample battery cells without electrolyte abnormalities. Then, whether target feature data of a current battery cell is within the preset first threshold range is determined. If yes, the battery cell is determined as an abnormal battery cell without electrolyte abnormalities; or if no, it is determined that the battery cell has no electrolyte abnormalities.

Similarly, it is assumed that the abnormal battery cells to be identified are abnormal battery cells with abnormal water content. A second threshold range corresponding to abnormal battery cells with abnormal water content can be summarized in advance based on target feature data of a large number of sample battery cells with abnormal water content and sample battery cells without abnormal water content. Then, whether target feature data of a current battery cell is within the preset second threshold range is determined. If yes, the battery cell is determined as an abnormal battery cell without abnormal water content; or if no, it is determined that the battery cell has no abnormal water content.

For example, it is assumed that the target feature data in the embodiments of this application includes only the first target parameter value corresponding to the first arrival of the parameter variation at the first process variation during the process of collecting parameters in the first stage of the formation process. In this case, a first target parameter threshold range can be preset, and then the first target parameter value is compared with the first target parameter threshold range. By doing so, when the first target parameter value falls within the first target parameter threshold range, it is determined that the battery cell is an abnormal battery cell.

For another example, it is assumed that the target feature data in the embodiments of this application includes the first target parameter value corresponding to the first arrival of the parameter variation at the first process variation during the process of collecting parameters in the first stage of the formation process, and the second target parameter value corresponding to the first arrival of the parameter variation at the second process variation during the process of collecting parameters in the first stage of the formation process. In this case, a first target parameter threshold range and a second target parameter threshold range can be preset, and then the first target parameter value is compared with the first target parameter threshold range, and the second target parameter value is compared with the second target parameter threshold range. By doing so, when the first target parameter value falls within the first target parameter threshold range and the second target parameter value falls within the second target parameter threshold range, it is determined that the battery cell is an abnormal battery cell.

It should be understood that the first target parameter threshold range and the second target parameter threshold range are values specified based on the statistics of the first target parameter values and the second target parameter values in the first stage of the formation process for a large number of first sample battery cells with electrolyte abnormalities and a large number of second sample battery cells without electrolyte abnormalities. Then, in the aforementioned method, under a condition that the battery cell is determined as an abnormal battery cell, it can further be determined that the battery cell has electrolyte abnormalities.

It should be understood that the first target parameter threshold range and the second target parameter threshold range are values specified based on the statistics of the first target parameter values and the second target parameter values in the first stage of the formation process for a large number of first sample battery cells with abnormal water content and a large number of second sample battery cells without abnormal water content. Then, in the aforementioned method, under a condition that the battery cell is determined as an abnormal battery cell, it can further be determined that the battery cell has abnormal water content.

To achieve accurate determination of whether a battery cell is an abnormal battery cell, in another optional implementation of the embodiments of this application, an identification model can be constructed to input the target feature data into the preset identification model, so as to obtain an identification result of whether the battery cell is an abnormal battery cell.

The identification model may be a pre-constructed two-dimensional Gaussian model but is not limited thereto. For example, the identification model may alternatively be a classification model such as a SVM (Support Vector Machine, support vector machine) model or a CART (Classification And Regression Tree, classification and regression tree) model that takes the target feature data as input.

It should be noted that when a classification model such as the SVM (Support Vector Machine, support vector machine) model or the CART (Classification And Regression Trec, classification and regression trec) model is used for identification, each sample battery cell required for model construction needs to be pre-marked as a first sample battery cell with abnormalities or a second sample battery cell without abnormalities. Similarly, for the foregoing optional implementation of threshold range-based identification, the sample battery cell used for setting the threshold range also needs to be pre-marked as a first sample battery cell with abnormalities or a second sample battery cell without abnormalities. However, when the two-dimensional Gaussian model is used for identification, marking is not necessary and the two types of sample battery cells can be differentiated by the clustering ability of the two-dimensional Gaussian model itself. Therefore, when the two-dimensional Gaussian model is used for identification, the workload of engineers can be reduced, and the difficulty of obtaining data corresponding to sample battery cells can be reduced.

It should be noted that in the embodiments of this application, first sample battery cells with electrolyte abnormalities and second sample battery cells without electrolyte abnormalities can be used for training classification models such as SVM and CART models. This enables the classification models to output whether a battery cell has electrolyte abnormalities. Similarly, first sample battery cells with abnormal water content and second sample battery cells without abnormal water content can also be used for training classification models such as SVM and CART models. This enables the classification models to output whether a battery cell has abnormal water content.

It should be understood that in the embodiments of this application, in order to identify a specific type of abnormality in a battery cell, sample battery cells with that specific abnormality and normal battery cells without that specific abnormality can be used for model training or construction, or threshold ranges can be for identification. This enables the identification for abnormal battery cells with that specific abnormality.

It should also be noted that when the identification model is a two-dimensional Gaussian model, there should be two kinds of target feature data to meet the data input requirements of the two-dimensional Gaussian model. For example, the target feature data can be a first target parameter value corresponding to the first arrival of a parameter variation at a first process variation and a second target parameter value corresponding to the first arrival of the parameter variation at a second process variation, during a process of collecting parameters in the first stage of the formation process.

The following uses a two-dimensional Gaussian model as an identification model example to further describe the solution of the embodiments of this application.

To ensure that accurate determination of whether a battery cell is an abnormal battery cell can be achieved based on the two-dimensional Gaussian model, it is needed to first select two types of target feature data and then construct an appropriate two-dimensional Gaussian model based on the two types of target feature data.

Figure 3:
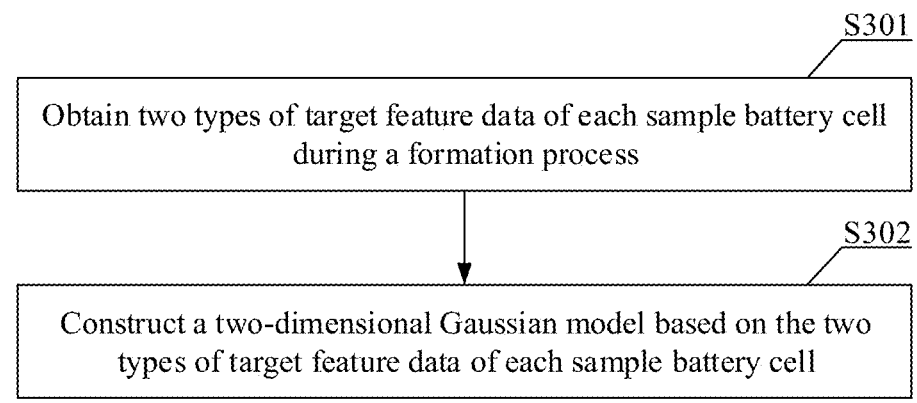
FIG. 3 is a schematic flowchart of a model construction method according to an embodiment of this application.

Referring to FIG. 3, FIG. 3 illustrates a model construction method provided in an embodiment of this application, including the following steps.

S301. Obtain two types of target feature data of each sample battery cell during a formation process.

It should be noted that the sample battery cells include a first sample battery cell with abnormalities and a second sample battery cell without abnormalities. For example, the first sample battery cell may be a sample battery cell with electrolyte abnormalities, while the second sample battery cell may be a normal battery cell without any abnormalities. The two types of target feature data may include feature data influenced by the electrolyte in the battery cell generated during the formation process. For another example, the first sample battery cell may be a sample battery cell with abnormal water content, while the second sample battery cell can be a normal battery cell without any abnormalities. The two types of target feature data may include feature data influenced by the water content in the battery cell generated during the formation process.

It should be noted that the two types of target feature data of the first sample battery cell and the second sample battery cell can be collected from the production line or other channels, which is not limited in the embodiments of this application.

S302. Construct a two-dimensional Gaussian model based on the two types of target feature data of each sample battery cell.

In the embodiments of this application, the mean value and variance of the two types of target feature data can be calculated, and the correlation coefficient between the two types of target feature data can be calculated. Based on the mean value and variance of the two types of target feature data and the correlation coefficient between features, the mean vector and the covariance matrix for the two-dimensional Gaussian model can be constructed. Then, based on the mean vector and covariance matrix, the two-dimensional Gaussian model can be obtained.

There may be some abnormal data in the two types of target feature data of the sample battery cells obtained, which may affect the reliability of the constructed two-dimensional Gaussian model. Therefore, in a feasible implementation of the embodiments of this application, a preliminary two-dimensional Gaussian model may first be constructed based on the two types of target feature data of all sample battery cells. Then, a final two-dimensional Gaussian model is constructed based on two types of target feature data of each sample battery cell belonging to a target cluster in the preliminary two-dimensional Gaussian model. The target cluster is a cluster represented by second sample battery cells without abnormalities in the preliminary two-dimensional Gaussian model.

It should be understood that the construction methods of the two two-dimensional Gaussian models are described in the preceding paragraph and are not repeated herein.

It should be understood that in the embodiments of this application, after the two-dimensional Gaussian model is constructed based on the two types of target feature data of the first sample battery cell and the second sample battery cell, the probability density distribution belonging to the second sample battery cell is obtained in the two-dimensional Gaussian model, and based on this distribution, a probability density threshold can be set.

Therefore, in a situation where the two-dimensional Gaussian model is used to determine whether the battery cell is an abnormal battery cell, after the two types of target feature data of the battery cell are input to the two-dimensional Gaussian model, a corresponding probability density of the battery cell can be obtained. Then, this probability density can be compared with the specified probability density threshold. If the probability density is less than the probability density threshold, it can be determined that the battery cell has an abnormality. Otherwise, it can be determined that the battery cell has no abnormality.

Figure 7:
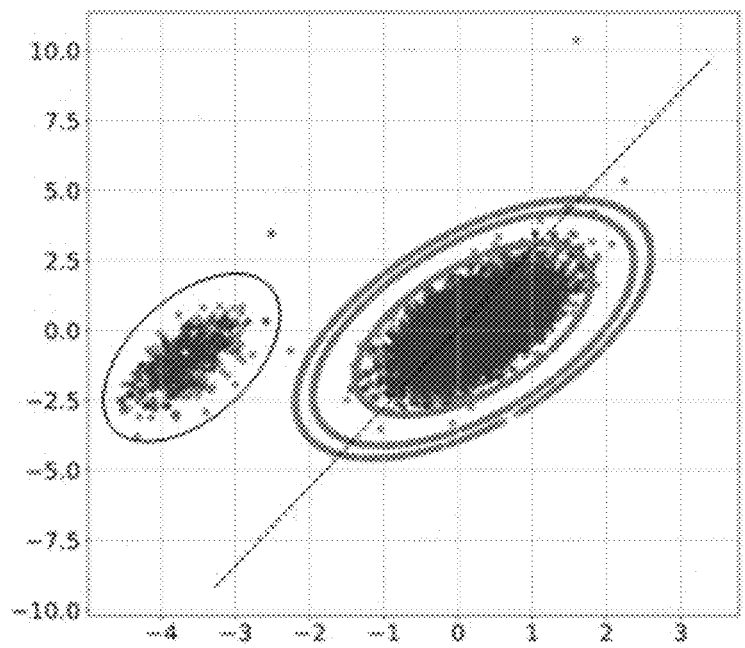
FIG. 7 is a schematic diagram of an effect of a two-dimensional Gaussian model in identifying a battery cell with abnormal water content according to an embodiment of this application.

It should be noted that after the two-dimensional Gaussian model is constructed, a schematic effect diagram similar to FIG. 7 can be obtained. Based on a region range (such as a region range inside the left circle in FIG. 7) where sample battery cells are clustered as abnormal battery cells, a corresponding feature range (such as an abscissa range and ordinate range corresponding to the left circle in FIG. 7) for abnormal battery cells can be obtained. Therefore, when the two-dimensional Gaussian model is used to determine whether a battery cell is an abnormal battery cell, target feature data of the battery cell can be input into the two-dimensional Gaussian model to obtain a probability density of the battery cell calculated by the two-dimensional Gaussian model. Then, under a condition that the probability density of the battery cell is less than a preset probability density threshold and that the target feature data is within a preset feature range, the battery cell is determined as an abnormal battery cell. In this way, whether a battery cell is an abnormal battery cell is determined from two aspects, improving the reliability for identifying abnormal battery cells.

It should be noted that the two types of target feature data used in constructing the two-dimensional Gaussian model should be consistent with the target feature data of the battery cells collected in the subsequent abnormal battery cell identification process. That is, under a condition that the two types of target feature data used in constructing the two-dimensional Gaussian model include: a first target parameter value corresponding to the first arrival of a parameter variation at a first process variation and a second target parameter value corresponding to the first arrival of the parameter variation at a second process variation, during a process of collecting parameters in the first stage of the formation process, the target feature data of the battery cell collected for identifying abnormal battery cell should also be: the first target parameter value corresponding to the first arrival of the parameter variation at the first process variation during the process of collecting parameters in the first stage of the formation process and the second target parameter value corresponding to the first arrival of the parameter variation at the second process variation during the process of collecting parameters in the first stage of the formation process.

It should also be noted that under a condition that the two types of target feature data include the first target parameter value corresponding to the first arrival of the parameter variation at the first process variation during the process of collecting parameters in the first stage of the formation process, and the second target parameter value corresponding to the first arrival of the parameter variation at the second process variation during the process of collecting parameters in the first stage of the formation process, to ensure the differentiation effect of the target feature data for abnormal battery cells and normal battery cells, the selected first process variation and the second process variation can be two process variations that have the maximum discriminability between the first sample battery cell and the second sample battery cell.

Therefore, to accurately find out the two process variations that have the maximum discriminability between the first sample battery cell and the second sample battery cell, in the embodiments of this application, target parameter values corresponding to different preset process variations reached by all sample battery cells during the formation process can be obtained, and then the first process variation and the second process variation can be identified based on the target parameter values corresponding to the different process variations.

For example, based on the target parameter values corresponding to the two different process variations, the discriminability between the first sample battery cell and the second sample battery cell corresponding to the two different process variations can be calculated, and then the two different process variations corresponding to the maximum discriminability can be determined as the first process variation and the second process variation.

It should be understood that in the embodiments of this application, the LDA (Linear Discriminant Analysis, linear discriminant analysis) algorithm can be used to calculate the discriminability between the first sample battery cell and the second sample battery cell corresponding to each two different process variations of all the different process variations (for example, the inter-class distance calculated by the LDA algorithm).

For example, it is assumed that there are three different process variations, A, B, and C, the discriminability ab between A and B, the discriminability ac between A and C, and the discriminability bc between B and C can be calculated using the LDA algorithm. Then, a maximum value can be determined from ab, ac, and bc. Assuming that the maximum value is ac, it can be determined that the first process variation and the second process variation are A and C, respectively.

In the embodiments of this application, to ensure the identification effect for the first process variation and the second process variation, the target parameter value corresponding to each process variation can be further normalized before the LDA algorithm is used for calculation, so that the target parameter value corresponding to each process variation is transformed into a standard normal distribution obeying $N(0, 1)$, thus facilitating the processing of the LDA algorithm.

It should be understood that another type of identification model can be trained based on the target feature data to obtain a well-trained identification model, which can then be used. The training process is consistent with the conventional training process for various types of identification models and therefore is not described in detail herein.

In the embodiments of this application, under a condition that a battery cell is determined as an abnormal battery cell, the battery cell can be marked for subsequent processing and analysis by engineers based on the mark.

For example, it is assumed that the battery cell is determined as an abnormal battery cell with electrolyte abnormalities. After identification for abnormal battery cells is performed on all battery cells of one or several batches, under a condition that the number of abnormal battery cells with electrolyte abnormalities is determined, based on the number of marked abnormal battery cells with electrolyte abnormalities, to exceed a preset quantity threshold, it can be determined that there is an electrolyte injection error. In such cases, appropriate operations such as electrolyte injection error reporting can be taken according to the preset method.

Certainly, in the embodiments of this application, marking can also be omitted. Instead, after each abnormal battery cell with electrolyte abnormalities is identified, the count of battery cells with electrolyte abnormalities can be updated. Then, based on the updated count of battery cells with electrolyte abnormalities currently determined, it can be determined whether the number of battery cells exceeds a preset threshold. If yes, it can be determined that there is an electrolyte injection error, and appropriate operations such as electrolyte injection error reporting can be taken according to the preset method.

For another example, it is assumed that the battery cell is determined as an abnormal battery cell with abnormal water content. After identification for abnormal battery cells is performed on all battery cells of one or several batches, under a condition that the number of abnormal battery cells with abnormal water content is determined, based on the number of marked abnormal battery cells with abnormal water content, to exceed a preset quantity threshold, it can be determined that there is a problem with the water content control stage in the battery cell production line. In such cases, appropriate operations such as reporting can be taken according to the preset method.

It should be understood that in the embodiments of this application, the preset method can include, but is not limited to, notifying relevant engineers through SMS or phone calls and triggering alarm sounds.

It should be noted that the above solution of the embodiments of this application can be realized by an electronic device with data processing capabilities, such as a PLC (Programmable Logic Controller, programmable logic controller), a computer, a smartphone, and a server.

It should be understood that in the embodiments of this application, the electronic device can be connected to the Industrial Internet so that the marked battery cells are notified to the Industrial Internet, and then to engineers by the Industrial Internet.

In the technical solution of the embodiments of this application, the target feature data influenced by electrolyte in the battery cell generated during the formation process of the battery cell is obtained and analyzed to determine whether the battery cell is an abnormal battery cell. On the one hand, there is a clear distinction in target feature data between an abnormal battery cell and a normal battery cell during the formation process of battery cells. Therefore, whether a battery cell is an abnormal battery cell can be accurately determined based on the target feature data, achieving reliable identification for an abnormal battery cell. On the other hand, since a formation process of a battery cell always occurs before the battery cell is loaded into a battery pack in an industrial production process, the purpose of identifying an abnormal battery cell before the battery cell is loaded can also be effectively achieved, reducing the risk of decreasing the battery system performance caused by loading abnormal battery cells and the risk of scrapping the battery pack caused by loading abnormal battery cells.

To facilitate understanding of the solution provided in the embodiments of this application, the following uses an example of a specific implementation process to further describe this application. In the example, an execution body is a PLC; target feature data includes a first film-forming peak value corresponding to the first arrival of a film-forming peak variation at a first process variation (such as a first film-forming peak gradient value) and a second film-forming peak value corresponding to the first arrival of the film-forming peak variation at a second process variation (such as the second film-forming peak gradient value), where the first film-forming peak value and the second film-forming peak value are collected in the first stage of a formation process; and a two-dimensional Gaussian model is used for identifying whether the battery cell has electrolyte abnormalities.

Figure 4:
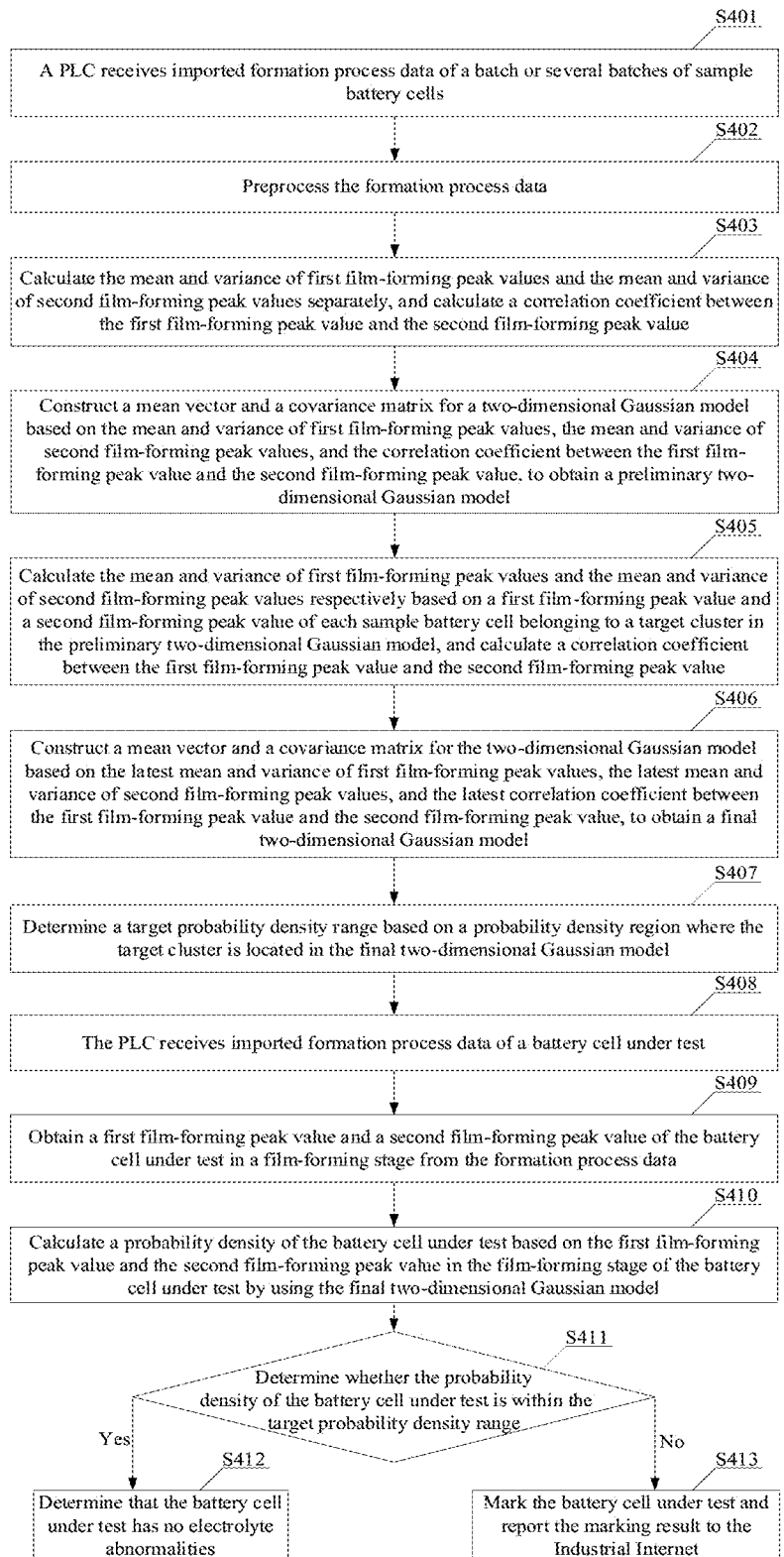
FIG. 4 is a specific schematic flowchart for identifying a battery cell with electrolyte abnormalities according to an embodiment of this application.

Referring to FIG. 4, the implementation process includes the following steps.

S401. A PLC receives imported formation process data of a batch or several batches of sample battery cells.

The formation process data can be imported according to formation batches or according to battery cells that have been subjected to formation each day. According to the law of large numbers, as the amount of data increases, the statistical parameters increasingly align with the normal data distribution pattern of battery cells. The batch of battery cells may include the first sample battery cells with electrolyte abnormalities and the second sample battery cells without electrolyte abnormalities.

It should be noted that the formation process data is process data (including but not limited to battery formation steps, time, current, voltage, temperature, and atmospheric pressure) saved during the formation process of the battery cells.

S402. Preprocess the formation process data.

This step includes: removing formation process data corresponding to battery cells that have experienced formation termination, abnormal sampling of the formation device, non-participation in formation, first-stage interruption, formation retesting, and the like, and obtaining data related to film-forming peaks (including film-forming peak values and film-forming peak gradient values) from the remaining formation process data.

Under a condition that the number of formation steps in formation process data of a sample battery cell is less than a specified number of formation steps, it is determined that the sample battery cell has experienced formation termination; under a condition that there is data corruption in formation process data of a sample battery cell, it is determined that the sample battery cell has experienced abnormal sampling by a formation device; under a condition that formation process data of a sample battery cell includes no current value and shows that the voltage value does not increase, it is determined that the sample battery cell has not participated in formation; under a condition that formation process data of a sample battery cell shows that charging is terminated and resumed in the first stage, it is determined that the sample battery cell has experienced first-stage interruption; and under a condition that the number of formation steps in formation process data of a sample battery cell is greater than a specified number of formation steps, it is determined that the sample battery cell has experienced formation retesting.

It should be noted that the film-forming peak value can be calculated based on the current, voltage, and other data in the formation process data. The film-forming peak gradient value can be obtained by taking the difference between two consecutive film-forming peak values acquired.

Then, an initial film-forming peak gradient value and a gradient change value can be preset. Based on the initial film-forming peak gradient value and the gradient change value, each preset film-forming peak gradient value can be determined. Subsequently, a film-forming peak value corresponding to the first arrival at each film-forming peak gradient value can be obtained.

It should be noted that a film-forming peak value corresponding to each film-forming peak gradient value can be the average calculated between two film-forming peak values associated with the film-forming peak gradient value corresponding to the first arrival at the film-forming peak gradient value. The film-forming peak gradient value is a difference between film-forming peaks of two adjacent sampling points. For example, assuming that values of film-forming peaks between two adjacent sampling points corresponding to the first arrival at a first film-forming peak gradient value are A and B, a film-forming peak value corresponding to the first film-forming peak gradient value can be (A+B)/2. Certainly, a film-forming peak value corresponding to each film-forming peak gradient value may alternatively be a value of either of two film-forming peaks corresponding to the film-forming peak gradient value, and this is not limited.

Then, based on film-forming peak values corresponding to each film-forming peak gradient value, a discriminability (that is, an inter-class distance calculated using the LDA algorithm) between a first sample battery cell and a second sample battery cell corresponding to each pair of different film-forming peak gradient values can be calculated by using the LDA algorithm, and then two different film-forming peak gradient values corresponding to the maximum discriminability are determined and are recorded as a first film-forming peak gradient value and a second film-forming peak gradient value. In addition, a first film-forming peak value (namely, a film-forming peak value corresponding to the first film-forming peak gradient value) and a second film-forming peak value (namely, a film-forming peak value corresponding to the second film-forming peak gradient value) corresponding to each sample battery cell are also obtained.

In the embodiments of this application, to ensure the identification effect for the first film-forming peak gradient value and the second film-forming peak gradient value, the film-forming peak value corresponding to each film-forming peak gradient value can be further normalized before the LDA algorithm is used for calculation, so that the film-forming peak value corresponding to each film-forming peak gradient value is transformed into a standard normal distribution obeying N(0, 1), thus facilitating the processing of the LDA algorithm.

S403. Calculate the mean and variance of first film-forming peak values and the mean and variance of second film-forming peak values separately, and calculate a correlation coefficient between the first film-forming peak value and the second film-forming peak value.

S404. Construct a mean vector and a covariance matrix for a two-dimensional Gaussian model based on the mean and variance of first film-forming peak values, the mean and variance of second film-forming peak values, and a correlation coefficient between the first film-forming peak value and the second film-forming peak value, to obtain a preliminary two-dimensional Gaussian model.

S405. Calculate the mean and variance of first film-forming peak values and the mean and variance of second film-forming peak values respectively based on a first film-forming peak value and a second film-forming peak value of each sample battery cell belonging to a target cluster in the preliminary two-dimensional Gaussian model, and calculate a correlation coefficient between the first film-forming peak value and the second film-forming peak value.

It should be understood that the target cluster is a cluster of second sample battery cells without electrolyte abnormalities in the preliminary two-dimensional Gaussian model.

S406. Construct a mean vector and a covariance matrix for the two-dimensional Gaussian model based on the latest mean and variance of first film-forming peak values, the latest mean and variance of second film-forming peak values, and the latest correlation coefficient between the first film-forming peak value and the second film-forming peak value, to obtain a final two-dimensional Gaussian model.

S407. Determine a target probability density range based on a probability density region where the target cluster is located in the final two-dimensional Gaussian model.

Figure 5:
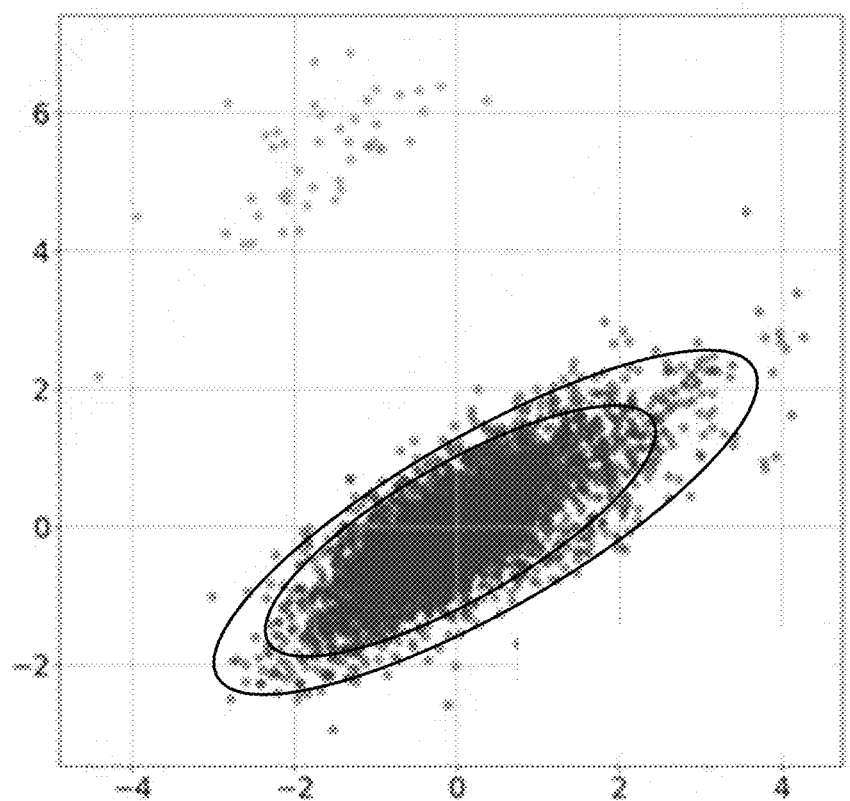
FIG. 5 is a schematic diagram of an effect of a two-dimensional Gaussian model in identifying a battery cell with electrolyte abnormalities according to an embodiment of this application.

For example, as shown in FIG. 5, a region delineated by two circles in FIG. 5 is a region where the target cluster is located. Engineers can take a probability density range corresponding to sample battery cells within a range delineated by either circle as the target probability density range. For example, a probability density range corresponding to sample battery cells in a region delineated by the outermost circle can be taken as the target probability density range. It should be understood that the horizontal coordinate in FIG. 5 represents the first film-forming peak value and the vertical coordinate represents the second film-forming peak value.

S408. The PLC receives imported formation process data of a battery cell under test.

S409. Obtain a first film-forming peak value and a second film-forming peak value of the battery cell under test in the first stage from the formation process data.

S410. Calculate a probability density of the battery cell under test based on the first film-forming peak value and the second film-forming peak value in the first stage of the battery cell under test by using the final two-dimensional Gaussian model.

S411. Determine whether the probability density of the battery cell under test is within the target probability density range; if yes, go to step S412; or if no, go to step S413.

For example, the target probability density range may be a range starting with 0. In this condition, only one probability density threshold can be specified to determine whether the probability density of the battery cell under test is less than the probability density threshold. If yes, indicating that the probability density of the battery cell under test is within the target probability density range, go to step S412; if no, go to step S413.

S412. Determine that the battery cell under test has no electrolyte abnormalities.

S413. Mark the battery cell under test and report the marking result to the Industrial Internet.

It should be understood that in the embodiments of this application, instead of making determination based on the probability density, an alternative approach is to convert the battery cell under test into a coordinate point in the coordinate system shown in FIG. 5 by taking the first film-forming peak value and the second film-forming peak value of the battery cell under test in the first stage as two coordinate values of a coordinate point, to determine whether the coordinate point lies within a specified circle (for example, the outermost circle in FIG. 5). If yes, it is determined that the battery cell under test has no electrolyte abnormalities; if no, it is determined that the battery cell under test has electrolyte abnormalities. Then, the battery cell under test can be marked and the making result can be reported to the Industrial Internet.

It should also be understood that the process shown in FIG. 4 essentially consists of two stages, where step S401 to step S407 are a model construction stage and step S408 to step S413 are a battery cell identification stage. After the final two-dimensional Gaussian model is constructed through steps S401 to S407, the final two-dimensional Gaussian model can be repeatedly applied, that is, steps S408 to S413 can be repeatedly performed for different battery cells under test.

In the above way, the purpose of identifying battery cells with electrolyte abnormalities before the battery cells are loaded can be achieved. In addition, experimental tests show that this method has strong robustness and a low false detection rate and can have good effects in practical applications.

To facilitate understanding of the solution provided in the embodiments of this application, the following uses an example of a specific implementation process to further describe this application. In the example, an execution body is a PLC; target feature data includes a first film-forming peak value corresponding to the first arrival of a film-forming peak variation at a first process variation (such as a second film-forming peak gradient value) and a second film-forming peak value corresponding to the first arrival of the film-forming peak variation at a second process variation (such as the first film-forming peak gradient value), where the first film-forming peak value and the second film-forming peak value are collected in the first stage of a formation process; and a two-dimensional Gaussian model is used for identifying whether the battery cell has electrolyte abnormalities.

Figure 6:
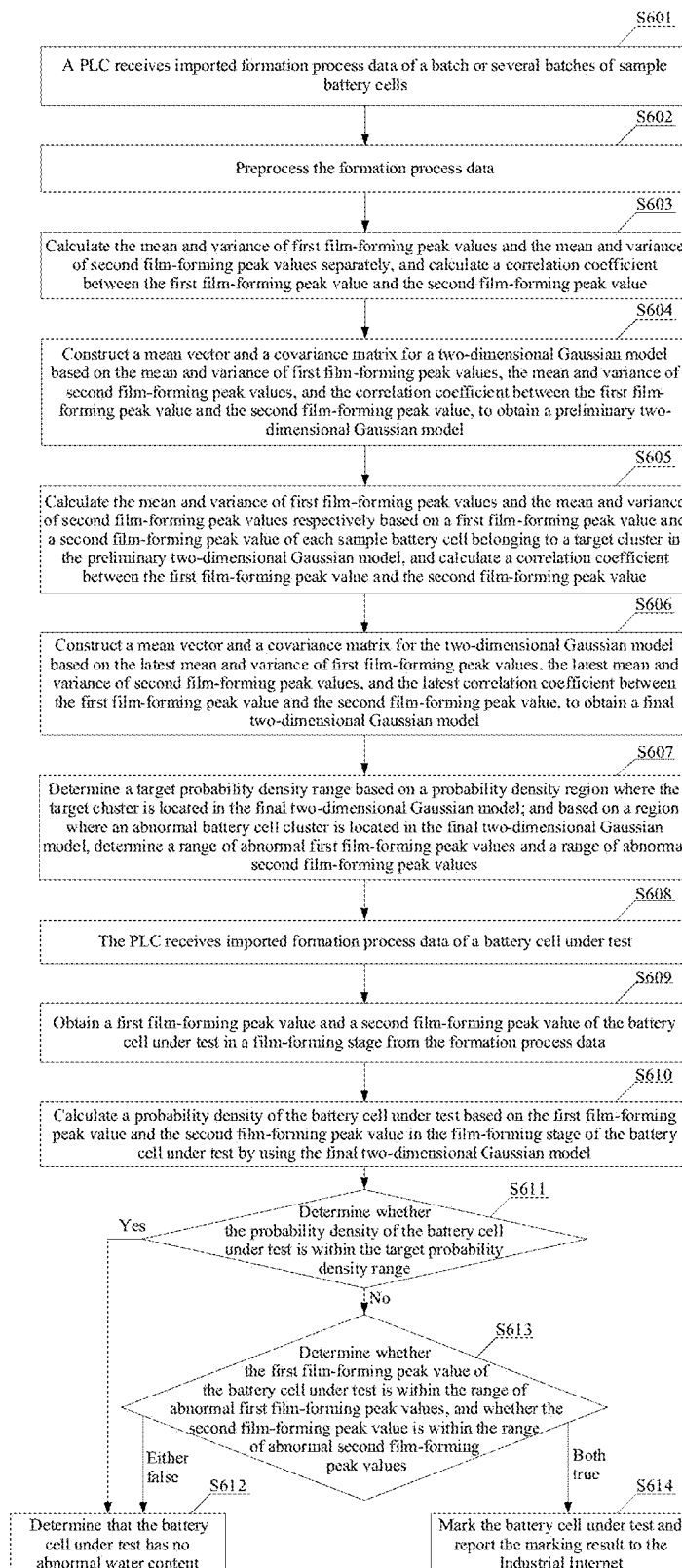
FIG. 6 is a specific schematic flowchart for identifying a battery cell with abnormal water content according to an embodiment of this application.

Referring to FIG. 6, the implementation process includes the following steps.

S601. A PLC receives imported formation process data of a batch or several batches of sample battery cells.

Similarly, the data can be imported according to formation batches or according to battery cells that have been subjected to formation each day. The battery cells may include the first sample battery cells with abnormal water content and the second sample battery cells without abnormal water content.

Similarly, the formation process data is process data (including but not limited to battery formation steps, time, current, voltage, temperature, and atmospheric pressure) saved during the formation process of the battery cells.

S602. Preprocess the formation process data.

This step includes: removing formation process data corresponding to battery cells that have experienced formation termination, abnormal sampling of the formation device, non-participation in formation, first-stage interruption, formation retesting, and the like, and obtaining data related to film-forming peaks (including film-forming peak values and film-forming peak gradient values) from the remaining formation process data.

Similarly, under a condition that the number of formation steps in formation process data of a sample battery cell is less than a specified number of formation steps, it is determined that the sample battery cell has experienced formation termination; under a condition that there is data corruption in formation process data of a sample battery cell, it is determined that the sample battery cell has experienced abnormal sampling by a formation device; under a condition that formation process data of a sample battery cell includes no current value and shows that the voltage value does not increase, it is determined that the sample battery cell has not participated in formation; under a condition that formation process data of a sample battery cell shows that charging is terminated and resumed in the first stage, it is determined that the sample battery cell has experienced first-stage interruption; and under a condition that the number of formation steps in formation process data of a sample battery cell is greater than a specified number of formation steps, it is determined that the sample battery cell has experienced formation retesting.

Then, an initial film-forming peak gradient value and a gradient change value can be preset. Based on the initial film-forming peak gradient value and the gradient change value, each preset film-forming peak gradient value can be determined. Subsequently, a film-forming peak value corresponding to the first arrival at each film-forming peak gradient value can be obtained.

Similarly, a film-forming peak value corresponding to each film-forming peak gradient value can be the average calculated between two film-forming peak values associated with the film-forming peak gradient value corresponding to the first arrival at the film-forming peak gradient value. The film-forming peak gradient value is a difference between film-forming peaks of two adjacent sampling points. Certainly, a film-forming peak value corresponding to each film-forming peak gradient value may alternatively be a value of either of two film-forming peaks corresponding to the film-forming peak gradient value, and this is not limited.

Then, based on film-forming peak values corresponding to each film-forming peak gradient value, a discriminability (that is, an inter-class distance calculated using the LDA algorithm) between a first sample battery cell and a second sample battery cell corresponding to each pair of different film-forming peak gradient values can be calculated by using the LDA algorithm, and then two different film-forming peak gradient values corresponding to the maximum discriminability are determined and are recorded as a first film-forming peak gradient value and a second film-forming peak gradient value. Meanwhile, a first film-forming peak value (namely, a film-forming peak value corresponding to the first film-forming peak gradient value) and a second film-forming peak value (namely, a film-forming peak value corresponding to the second film-forming peak gradient value) corresponding to each sample battery cell are also obtained.

Optionally, to ensure the identification effect for the first film-forming peak gradient value and the second film-forming peak gradient value, the film-forming peak value corresponding to each film-forming peak gradient value can be further normalized before the LDA algorithm is used for calculation, so that the film-forming peak value corresponding to each film-forming peak gradient value is transformed into a standard normal distribution obeying $N(0, 1)$, thus facilitating the processing of the LDA algorithm.

S603. Calculate the mean and variance of first film-forming peak values and the mean and variance of second film-forming peak values separately, and calculate a correlation coefficient between the first film-forming peak value and the second film-forming peak value.

S604. Construct a mean vector and a covariance matrix for a two-dimensional Gaussian model based on the mean and variance of first film-forming peak values, the mean and variance of second film-forming peak values, and the correlation coefficient between the first film-forming peak value and the second film-forming peak value, to obtain a preliminary two-dimensional Gaussian model.

S605. Calculate the mean and variance of first film-forming peak values and the mean and variance of second film-forming peak values respectively based on a first film-forming peak value and a second film-forming peak value of each sample battery cell belonging to a target cluster in the preliminary two-dimensional Gaussian model, and calculate a correlation coefficient between the first film-forming peak value and the second film-forming peak value.

It should be understood that the target cluster is a cluster of second sample battery cells without abnormal water content in the preliminary two-dimensional Gaussian model.

S606. Construct a mean vector and a covariance matrix for the two-dimensional Gaussian model based on the latest mean and variance of first film-forming peak values, the latest mean and variance of second film-forming peak values, and the latest correlation coefficient between the first film-forming peak value and the second film-forming peak value, to obtain a final two-dimensional Gaussian model.

S607. Determine a target probability density range based on a probability density region where the target cluster is located in the final two-dimensional Gaussian model; and based on a region where an abnormal battery cell cluster is located in the final two-dimensional Gaussian model, determine a range of abnormal first film-forming peak values and a range of abnormal second film-forming peak values.

For example, as shown in FIG. 7 (in FIG. 7, the horizontal coordinate represents the first film-forming peak value and the vertical coordinate represents the second film-forming peak value), a region delineated by the three circles on the right side of FIG. 7 is a region where the target cluster is located, and a region delineated by the circle on the left side is a region where the abnormal battery cell cluster is located. For example, a probability density range corresponding to sample battery cells in a region delineated by any one of the three circles on the right side can be taken as the target probability density range. For example, a probability density range corresponding to sample battery cells in a region delineated by the outermost circle can be taken as the target probability density range. The range of horizontal coordinates within the circle on the left side can be taken as the range of abnormal first film-forming peak values, and the range of vertical coordinates within the circle on the left side can be taken as the range of abnormal second film-forming peak values.

S608. The PLC receives imported formation process data of a battery cell under test.

S609. Obtain a first film-forming peak value and a second film-forming peak value of the battery cell under test in the first stage from the formation process data.

S610. Calculate a probability density of the battery cell under test based on the first film-forming peak value and the second film-forming peak value in the first stage of the battery cell under test by using the final two-dimensional Gaussian model.

S611. Determine whether the probability density of the battery cell under test is within the target probability density range; if yes, go to step S612; or if no, go to step S613.

For example, the target probability density range may be a range starting with 0. In this condition, only one probability density threshold can be specified to determine whether the probability density of the battery cell under test is less than the probability density threshold. If yes, indicating that the probability density of the battery cell under test is within the target probability density range, go to step S612; if no, go to step S613.

S612. Determine that the battery cell under test has no abnormal water content.

S613. Determine whether the first film-forming peak value of the battery cell under test is within the range of abnormal first film-forming peak values, and whether the second film-forming peak value is within the range of abnormal second film-forming peak values. If yes (that is, the first film-forming peak value is within the range of abnormal first film-forming peak values, and the second film-forming peak value is within the range of abnormal second film-forming peak values), go to step S601; otherwise, go to step S612.

S614. Mark the battery cell under test and report the marking result to the Industrial Internet.

It should be understood that in the embodiments of this application, instead of making determination based on the probability density, an alternative approach is to directly use the first film-forming peak value and the second film-forming peak value in the first stage of the battery cell under test as two coordinate values of a coordinate point to convert the battery cell under test into a coordinate point in the coordinate system shown in FIG. 7 so as to determine whether the coordinate point lies within the circle on the left side in FIG. 7 (that is, without first making determination based on the probability density, directly perform the determination in step S613). If no, it is determined that the battery cell under test has no abnormal water content; if no, it is determined that the battery cell under test has abnormal water content. Then, the battery cell under test can be marked and the making result can be reported to the Industrial Internet.

It should also be understood that the process shown in FIG. 6 essentially consists of two stages, where step S601 to step S607 are a model construction stage and step S608 to step S614 are a battery cell identification stage. After the final two-dimensional Gaussian model is constructed through steps S601 to S607, the final two-dimensional Gaussian model can be repeatedly applied, that is, steps S608 to S614 can be repeatedly performed for different battery cells under test.

In the above way, the purpose of identifying battery cells with abnormal water content before the battery cells are loaded can be achieved. In addition, experimental tests show that this method has strong robustness and a low false detection rate and can have good effects in practical applications. Furthermore, the above solution does not require damaging the battery cells to detect abnormal water content in each battery cell, ensuring high detection reliability.

Figure 8:
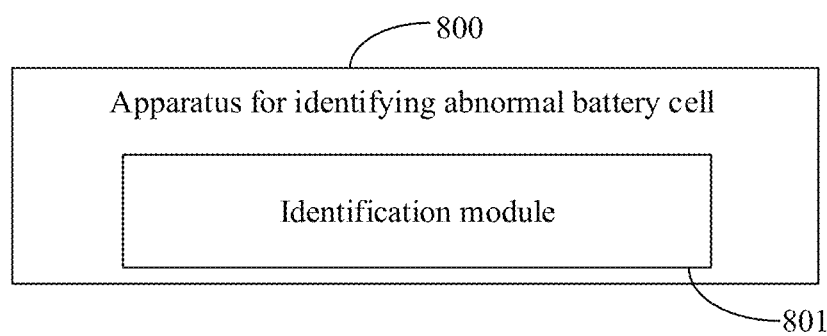
FIG. 8 is a schematic structural diagram of an apparatus for identifying abnormal battery cell according to an embodiment of this application.
Figure 9:
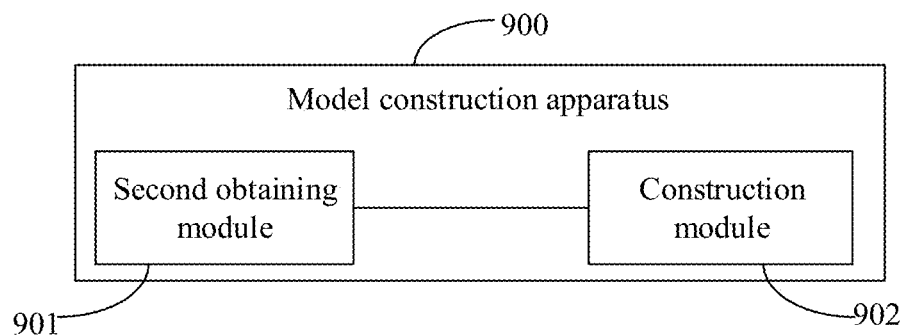
FIG. 9 is a schematic structural diagram of a model construction apparatus according to an embodiment of this application.

Based on the same inventive idea, an embodiment of this application further provides an apparatus 800 for identifying abnormal battery cell and a model construction apparatus 900. Referring to FIG. 8 and FIG. 9, FIG. 8 shows an apparatus for identifying abnormal battery cell using the method shown in FIG. 2, and FIG. 9 shows a model construction apparatus using the method shown in FIG. 3. It should be understood that specific functions of the apparatus 800 and apparatus 900 can be found in the description above, and a detailed description is appropriately omitted herein to avoid repetition. The apparatus 800 and apparatus 900 include at least one software function module capable of being stored in memory in the form of software or being embedded in the operating system of the apparatus 800 and apparatus 900 in the form of firmware. Details are as follows.

Referring to FIG. 8, the apparatus 800 includes:

an identification module 801 configured to determine, based on target feature data of a battery cell, whether the battery cell is an abnormal battery cell; where the target feature data includes feature data used for differentiation between an abnormal battery cell and a normal battery cell generated during a formation process.

In an optional embodiment of the embodiments of this application, the target feature data includes feature data influenced by electrolyte in the battery cell generated during the formation process.

In another optional embodiment of the embodiments of this application, the target feature data includes feature data influenced by water content in the battery cell generated during the formation process.

In the above two optional embodiments, the target feature data includes a first target parameter value corresponding to the first arrival of a parameter variation at a first process variation and a second target parameter value corresponding to the first arrival of the parameter variation at a second process variation, during a process of collecting parameters in the first stage of the formation process; where the first process variation and the second process variation are different.

In the embodiments of this application, the identification module 801 is specifically configured to input the target feature data into a preset identification model to obtain an identification result of whether the battery cell is an abnormal battery cell.

In the embodiments of this application, the identification model is a two-dimensional Gaussian model.

In the embodiments of this application, the identification module 801 is specifically configured to: input the target feature data into the two-dimensional Gaussian model to obtain a probability density of the battery cell calculated by the two-dimensional Gaussian model; and under a condition that the probability density of the battery cell is less than a preset probability density threshold, determine that the battery cell is an abnormal battery cell.

In the embodiments of this application, the identification module 801 is specifically configured to: input the target feature data into the two-dimensional Gaussian model to obtain a probability density of the battery cell calculated by the two-dimensional Gaussian model; and under a condition that the probability density of the battery cell is less than a preset probability density threshold and that the target feature data is within a preset feature range, determine that the battery cell is an abnormal battery cell.

In the embodiments of this application, the identification module 801 is specifically configured to determine, during the formation process of the battery cell based on the target feature data of the battery cell, whether the battery cell is an abnormal battery cell.

In the embodiments of this application, the apparatus 800 further includes a marking module for marking an abnormal battery cell.

Referring to FIG. 9, the apparatus 900 includes:

a second obtaining module 901 configured to obtain two types of target feature data of each sample battery cell during a formation process; where the target feature data includes feature data used for differentiation between an abnormal battery cell and a normal battery cell generated during a formation process, and the sample battery cells include a first sample battery cell with abnormalities and a second sample battery cell without abnormalities; and a construction module 902 for constructing a two-dimensional Gaussian model based on the two types of target feature data of each sample battery cell.

In an optional implementation of the embodiments of this application, the first sample battery cell is a sample battery cell with electrolyte abnormalities, and the target feature data includes feature data influenced by electrolyte in the battery cell generated during the formation process.

In another optional implementation of the embodiments of this application, the first sample battery cell is a sample battery cell with abnormal water content, and the target feature data includes feature data influenced by water content in the battery cell generated during the formation process.

In the above optional implementations, the two types of target feature data include a first target parameter value corresponding to the first arrival of a parameter variation at a first process variation and a second target parameter value corresponding to the first arrival of the parameter variation at a second process variation, during a process of collecting parameters in the first stage of the formation process; where the first process variation and the second process variation are different.

In the embodiments of this application, the construction module 902 is specifically configured to construct a preliminary two-dimensional Gaussian model based on the two types of target feature data of each sample battery cell and construct a final two-dimensional Gaussian model based on two types of target feature data of each sample battery cell belonging to a target cluster in the preliminary two-dimensional Gaussian model, where the target cluster is a cluster of second sample battery cells without electrolyte abnormalities in the preliminary two-dimensional Gaussian model.

In the above optional implementations, the second obtaining module 901 is specifically configured to obtain target parameter values corresponding to the first arrival at different preset process variations of all sample battery cells during the formation process, and identify the first process variation and the second process variation based on the target parameter values corresponding to the different process variations, and determine that a target parameter value corresponding to the first process variation and a target parameter value corresponding to the second process variation are the two types of target feature data of the sample battery cells. The first process variation and the second process variation are two process variations with a maximum discriminability between the first sample battery cell and the second sample battery cell among the preset different process variations.

In the above optional implementations, the second obtaining module 901 is specifically configured to calculate the discriminability between the first sample battery cell and the second sample battery cell corresponding to the two different process variations, based on the target parameter values corresponding to the two different process variations, and determine the two different process variations corresponding to the maximum discriminability as the first process variation and the second process variation.

It should be understood that, for the sake of brevity, descriptions in the foregoing method section are not repeated in the apparatus section.

Figure 10:
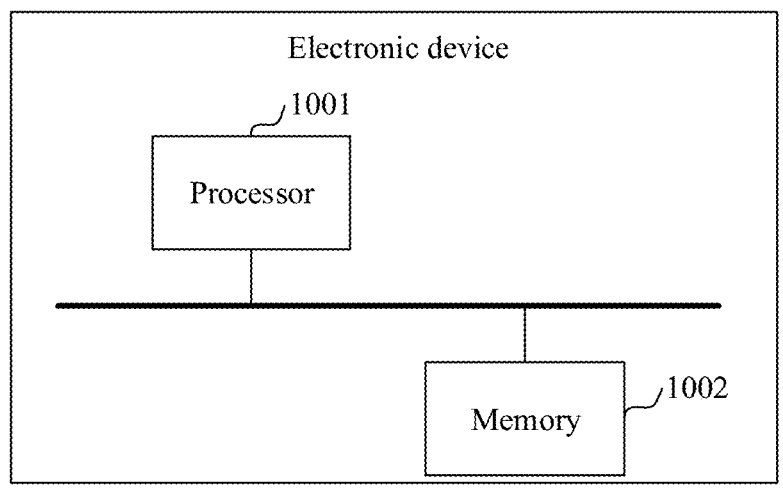
FIG. 10 is a schematic structural diagram of an electronic device according to an embodiment of this application.

An embodiment of this application further provides an electronic device. Referring to FIG. 10, the electronic device includes a processor 1001 and a memory 1002. Among them, The processor 1001 is configured to execute one or more instructions stored in the memory 1002 to implement the foregoing method for identifying abnormal battery cell or to implement the model construction method described above.

It should be noted that the processor 1001 and the memory 1002 can be connected via, but not limited to, an internal communication bus.

It should be understood that the structure shown in FIG. 10 is for illustration only, and the electronic device may include more or fewer components than shown in FIG. 10 or may have a different configuration from that shown in FIG. 10. For example, the electronic device may further have a data input interface, a data output interface, and other components.

In an embodiment of this application, the electronic device may be a PLC, a computer, a smartphone, a server, and other devices with data processing capabilities, without limitation in the embodiments of this application.

It should be noted that the PLC is a digital computing controller with a microprocessor, configured for automation control. The PLC can load at any time control instructions to the memory for storage for execution. The PLC consists of functional units such as a microprocessor, a memory, an input/output interface, and power supply. When the electronic device is a PLC, the processor 1001 is a microprocessor of the PLC, and the memory 1002 is a memory of the PLC.

An embodiment of this application further provides a computer-readable storage medium, such as a floppy disk, an optical disk, a hard drive, a flash memory, a USB drive, an SD (Secure Digital Memory Card, secure digital memory card) card, and an MMC (Multimedia Card, multimedia card) card. The computer-readable storage medium stores one or more instructions for implementing the various steps described above. The one or more instructions can be executed by one or more processors to implement the method for identifying abnormal battery cell or the model construction method described above. This is not repeated herein.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structure or step conflict, the various technical features mentioned in the embodiments can be combined in any manner. This application is not limited to the specific embodiments disclosed in this specification but includes all technical solutions falling within the scope of the claims.

What is claimed is:

1. A method for identifying abnormal battery cell, comprising:

determining, based on target feature data of a battery cell, whether the battery cell is an abnormal battery cell; and in response to the determining that the battery cell is abnormal, marking the battery cell as abnormal for removal from subsequent production, wherein:

the target feature data comprises feature data used for differentiation between an abnormal battery cell and a normal battery cell generated during a formation process, the target feature data comprises a first target parameter value corresponding to a first arrival of a variation of a target parameter at a first process variation and a second target parameter value corresponding to a first arrival of the variation of the target parameter at a second process variation, the first process variation and the second process variation are different, the target parameter is selected from film-forming peak (dQ/dV), dynamic internal resistance (V/I), or dV/dQ, the first arrival of the variation of the target parameter at the first or second process variation corresponds to an earliest occurrence during a first stage of the formation process at which a difference between two consecutive sampling points of the target parameter equals the first or second process variation, respectively, the first or second target parameter value is obtained from the sampling points associated with the first arrival of the variation of the target parameter at the first or second process variation, respectively; and determining, based on the target feature data of the battery cell, whether the battery cell is an abnormal battery cell comprises:

inputting the first and second target parameter values into a two-dimensional Gaussian distribution model constructed from sample battery cells to obtain an identification result of whether the battery cell is an abnormal battery cell, the obtaining the identification result comprising calculating a probability density of the battery cell; and in response at least to the probability density being less than a preset probability density threshold, determining that the battery cell is an abnormal battery cell.

2. The method for identifying abnormal battery cell according to claim 1, wherein the target feature data comprises feature data influenced by electrolyte in the battery cell generated during the formation process.

3. The method for identifying abnormal battery cell according to claim 1, wherein the target feature data comprises feature data influenced by water content in the battery cell generated during the formation process.

4. The method for identifying abnormal battery cell according to claim 1, wherein determining, based on the target feature data of the battery cell, whether the battery cell is an abnormal battery cell comprises:

determining, during the formation process of the battery cell based on the target feature data of the battery cell, whether the battery cell is an abnormal battery cell.

5. An electronic device, comprising a processor and a memory; wherein the processor is configured to execute one or more instructions stored in the memory to implement the method for identifying abnormal battery cell according to claim 1.

6. A non-transitory computer-readable storage medium storing one or more instructions, the instructions being executable by a processor to implement the method for identifying abnormal battery cell according to claim 1.

7. An apparatus for identifying battery cell with electrolyte abnormalities, comprising:
  a processor; and
  a memory coupled to the processor, the memory storing instructions which, when executed the processor, cause the processor to:
  determine, based on target feature data of a battery cell, whether the battery cell is an abnormal battery cell; and
  in response to the determining that the battery cell is abnormal, mark the battery cell as abnormal for removal from subsequent production,
  wherein:
    the target feature data comprises feature data used for differentiation between an abnormal battery cell and a normal battery cell generated during a formation process, the target feature data comprises a first target parameter value corresponding to a first arrival of a variation of a target parameter at a first process variation and a second target parameter value corresponding to a first arrival of the variation of the target parameter at a second process variation, the first process variation and the second process variation are different, the target parameter is selected from film-forming peak (dQ/dV), dynamic internal resistance (V/I), or dV/dQ, the first arrival of the variation of the target parameter at the first or second process variation corresponds to an earliest occurrence during a first stage of the formation process at which a difference between two consecutive sampling points of the target parameter equals the first or second process variation, respectively, the first or second target parameter value is obtained from the sampling points associated with the first arrival of the variation of the target parameter at the first or second process variation, respectively; and
  determining, based on the target feature data of the battery cell, whether the battery cell is an abnormal battery cell comprises:
    inputting the first and second target parameter values into a two-dimensional Gaussian distribution model constructed from sample battery cells to obtain an identification result of whether the battery cell is an abnormal battery cell, the obtaining the identification result comprising calculating a probability density of the battery cell; and
    in response to the probability density being less than a preset probability density threshold and the target feature data being within a preset feature range, determining that the battery cell is an abnormal battery cell.

* * * * *